United States Patent [19]

Villard et al.

[11] Patent Number: 4,927,617
[45] Date of Patent: May 22, 1990

[54] PROCESS OF PRODUCING CONCENTRATED SOLUTIONS OF AMMONIUM NITRATE

[75] Inventors: Alexandre Villard; Yves Cotonea, both of Rouen, France

[73] Assignee: Societe Chimique des Charbonnages S.A., Paris, France

[21] Appl. No.: 20,770

[22] Filed: Mar. 2, 1987

[51] Int. Cl.$^5$ .................................................. C06B 1/04
[52] U.S. Cl. ................................................... 423/396
[58] Field of Search ......................................... 423/396

[56] References Cited

U.S. PATENT DOCUMENTS

| | | |
|---|---|---|
| 2,551,569 | 5/1951 | Strelzoff ............................. 423/396 |
| 2,568,901 | 9/1951 | Stengel ............................... 423/396 |
| 2,618,547 | 11/1952 | Davenport et al. . |
| 2,755,176 | 7/1956 | Pearce et al. . |
| 2,902,342 | 9/1959 | Kerley, Jr. . |
| 2,977,201 | 3/1961 | Stephens . |
| 3,238,021 | 3/1966 | Webber et al. . |
| 3,301,657 | 1/1967 | Dee et al. ............................ 423/396 |
| 3,310,371 | 3/1967 | Lutz . |
| 3,362,809 | 1/1968 | Tucker . |
| 3,399,031 | 8/1968 | McCarthy . |
| 3,419,378 | 12/1968 | Kearns . |
| 3,464,808 | 9/1969 | Kearns . |
| 3,482,945 | 12/1969 | Legal, Jr. . |
| 3,502,441 | 3/1970 | Hudson ............................... 423/396 |
| 3,503,706 | 3/1970 | Legal, Jr. . |
| 4,308,049 | 12/1981 | Mini .................................... 423/396 |
| 4,699,773 | 10/1987 | Ulrichs et al. ..................... 422/113 |

FOREIGN PATENT DOCUMENTS

| | | |
|---|---|---|
| 813196 | 3/1937 | France . |
| 1029010 | 5/1953 | France . |
| 1093912 | 5/1955 | France . |
| 1356054 | 2/1964 | France . |
| 1426746 | 4/1966 | France . |
| 474181 | 10/1937 | United Kingdom ............ 423/396 |
| 496847 | 12/1938 | United Kingdom ............ 423/396 |
| 1105466 | 3/1968 | United Kingdom . |

OTHER PUBLICATIONS

Ammonium Nitride Technology, U. M. Olevski, pp. 193-198, (1978).

Primary Examiner—John Doll
Assistant Examiner—Wayne A. Langel
Attorney, Agent, or Firm—Finnegan, Henderson, Farabow, Garrett & Dunner

[57] ABSTRACT

Process for producing concentrated solutions of ammonium nitrate by neutralization of nitric acid with ammonia in a pipe reactor.

When the global flow of reactives corresponds to an output higher than 150 kg/h/cm$^2$ neutralization is performed in the presence of recycled concentrated solutions of ammonium nitrate. When the global flow is higher than 150 kg/h/cm$^2$ recycling is not necessary.

4 Claims, 1 Drawing Sheet

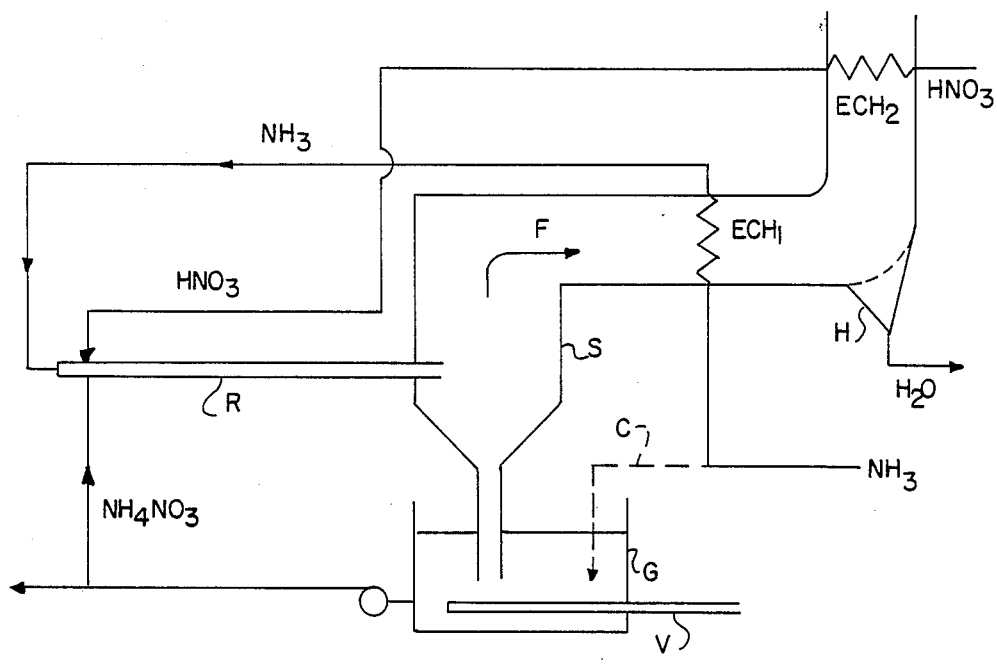

PROCESS OF PRODUCING CONCENTRATED SOLUTIONS OF AMMONIUM NITRATE

The present invention relates to a process for producing concentrated solutions of ammonium nitrate by neutralization of nitric acid with ammonia.

The present invention relates to a process for producing concentrated solutions of ammonium nitrate characterized in that neutralization is carried out in a pipe reactor.

The pipe reactor or tubular reactor is a length of pipe having a rather small diameter and containing no inside stuffing. These tubular reactors have been used for the manufacture of ammonium phosphates by neutralization of phosphoric acid with ammonia. The reaction is quite instantaneous and vaporization of the water contained in phosphoric acid takes place. The use of a pipe reactor for the production of ammonium phosphate has been described in many patents such as the following: FR-B 1426746, USA 2618547, USA 2755176, USA 2902342, USA 2977201, USA 3238021, USA 3310371, USA 3362809, USA 3399031, USA 3419378, USA 3464808, USA 3482945, USA 3503706. The pipe reactor used is horizontally set or stands at small angle to an horizontal line. The pipe reactors most generally used have a diameter ranging between 200 mm and 10 mm and a length ranging between 1.50 meter and 10 meters. The ratio length/diameter is usually not below 50. According to the present application neutralization of nitric acid with ammonia is performed with or without recycling of concentrated solution of ammonium nitrate as a function of the global flow of reactives. Thus when the global flow of reactives corresponds to an output lower than 150 kg/h/cm$^2$, the reaction leads to the formation of an aerosol of droplets or of solids microparticles generating an important cloud of smoke or fog from which it is very difficult, if not possible, to separate the desired product. The applicant has found that, in such a case, when concentrated nitric acid is injected together with ammonia, into a flow of recycled solutions of ammonium nitrate, the pipe reactor product is an easily separable mixture of droplets of ammonium nitrate solution and steam. Nitric acid is injected in the presence of a volume of ammonium nitrate ranging between 1 and 5 times the volume of produced ammonium nitrate solution. The lower the global flow of reactives, the higher the recycling rate.

It was already known to react concentrated nitric acid and ammonia inside a high volume of aqueous solution of ammonium nitrate. The reactives are injected in an apparatus comprising two distinct chambers connected by vertical tubes. The reactives are introduced at the bottom of the lower chamber and the reaction heat leads to vaporization of the water contained in concentrated nitric acid. This boiling takes place in the second chamber disposed above the first chamber and communicating with the latter through vertical tubes. A phenomenon of thermosiphon makes the product go up in some vertical tubes and down in others. In this type of apparatus the recycle rate (calculated as the ratio of the volume of recycled ammonium nitrate to the volume of produced ammonium nitrate solution) is about 100/1. Installations using this type of reactor are cumbersome and contain a large volume of a rather dangerous product maintained at elevated temperatures (140°–160° C.).

When the global flow of reactives is such that the production is higher than 150 kg/h/cm$^2$, it is no longer necessary to recycle ammonium nitrate solutions. No smoke is produced. It must however be noted that it is advantageous to introduce, on commencing operation, a certain quantity of ammonium nitrate solution. Thus, at that time, the opening of the valves is not instantaneous and takes about ten seconds during which plenty of smoke is produced. Furthermore it is preferable to provide a device for recycling ammonium nitrate solutions in order to be able to modify the global flow of the reactives according to need.

The process of the invention can be carried out in the following unit.

This unit is essentially characterized by the fact that it comprises at least a pipe reactor provided with feed means for introducing reactives (HNO$_3$—NH$_3$), at least a separator for separating steam from the reaction product (concentrated aqueous solution of ammonium nitrate) and optionally recycling means of part of the reaction product into pipe reactor. The pipe reactor has feed means for recycled solution.

Other characteristics and advantages of the invention will be better understood from the following description with reference to the accompanying diagrammatic drawing.

Pipe reactor (R) is provided at one of its ends with three feed means for NH$_3$, HNO$_3$ and NH$_3$NO$_3$ recycled solutions. The feed means are preferably built up in order to cause a turbulent flow. At the other end of the pipe reactor, a concentrated solution of ammonium nitrate is discharged and fed into separator (S). At the bottom part of the separator (S), concentrated solutions of ammonium nitrate are separated and stored. Part of these solutions are optionally recycled after neutralization with NH$_3$ fed at (C). Storage tanks (G) may be heated by inside heating means (V) in order to maintain the solutions in a liquid state in case of unit stopping. In the upper part of separator (S), steam is carried off following arrow (F). Condensate is discharged at H. Preheating of NH$_3$ and HNO$_3$ takes place in heat exchangers (ECH$_1$, ECH$_2$) before introduction in reactor (R). The amount of NH$_3$ added in storage tank (G) a function of the acidity of the product solutions, which is a function of the amount of HNO$_3$ used. An excess of HNO$_3$ is necessary to maintain acidity in the product issuing from the reactor in order to avoid loss of NH$_3$.

The advantages of the process of the present invention are the following:
small investment cost for the reactor as it is very simple and has a small diameter,
a very small inertia of the unit as the amounts of ammonium nitrate solutions circulating are small,
risks due to acid nitrate are lowered as the volume of circulating solutions is small.

The following examples illustrate the invention.

EXAMPLE 1 (comparative)

In a pipe reactor having a diameter of 15 mm are fed per hour:
157 liters of 57.5% nitric acid,
33.5 kg of gaseous ammonia at 20° C.

A dense smoke is obtained and the test is stopped after a few minutes. The estimated loss of ammonium nitrate is about 40%.

EXAMPLE 2

In an unit as illustrated in the annexed figure with the same pipe reactor as in example 1 are fed per hour:
218.4 liters of 57.5% nitric acid at 20° C.,
46 kg of gaseous ammonia at 60° C.,
1000 kg of recycled ammonium nitrate solution having a 92% concentration and a temperature of 150° C.

An output of 1230 kg/h of ammonium nitrate solution having a 91.2% concentration and a temperature of 140° C. is obtained. The total N losses are 5.8% of the total amount of N provided by $HNO_3$ and $NH_3$.

EXAMPLE 3

In the same unit as in example 2 are fed per hour:
373 liters of 57.5% nitric acid at 20° C.,
76.8 liters of gaseous ammonia at 80° C.,
700 kg of recycled ammonium nitrate solutions having a concentration of 92% and a temperature of 150° C. in which was introduced at C 1,2 kg of $NH_3$.

The output is 1120 kg/h of a weakly acidic solution (free acidity 6 g of $HNO_3$ per liter of solution) having a concentration of 92.4% and a temperature of 155° C.

The total losses of N amount to 0.15%.

EXAMPLE 4

In the same unit as in example 2 are fed per hour:
480 liters of 57.5% nitric acid preheated at 45° C.,
97.5 kg of gaseous ammonia at 58° C.

The output is 518 kg per hour of a weakly acidic ammonium nitrate solution) having a concentration of 88.3% and a temperature of 148° C.

The total losses of N amount to 0.6%.

We claim:

1. Process for producing concentrated solutions of ammonium nitrate which comprises neutralizing nitric acid with ammonia in a substantially horizontal pipe reactor containing no packing wherein the global flow of reactants is less than 150 kg/h/cm$^2$ and a recycled flow of ammonium nitrate solution is present having a recycling ratio ranging between 1:1 and 5:1.

2. Process according to claim 1 further comprising supplying reactants ($HNO_3$ and $NH_3$) to said pipe reactor, separating said produced concentrated solution of ammonium nitrate from steam in a separator and recycling said ammonium nitrate solution from said separator into said pipe reactor.

3. Process for producing concentrated solutions of ammonium nitrate which comprises neutralizing nitric acid with ammonia in a substantially horizontal pipe reactor containing no packing wherein the global flow of reactants is greater than 150 kg/h/cm$^2$ and no recycling of ammonium nitrate solution is carried out.

4. Process according to claim 3 further comprising supplying reactants ($HNO_3$ and $NH_3$) to said pipe reactor, and separating said concentrated solution of ammonium nitrate from steam in a separator.

* * * * *